United States Patent
Deo (10) Patent No.: US 9,148,524 B2
(45) Date of Patent: *Sep. 29, 2015

(54) METHODS, SYSTEMS, AND COMPUTER READABLE MEDIA FOR CACHING CALL SESSION CONTROL FUNCTION (CSCF) DATA AT A DIAMETER SIGNALING ROUTER (DSR)

(75) Inventor: Ajay Padmakar Deo, Carrollton, TX (US)

(73) Assignee: TEKELEC, INC., Morrisville, NC (US)

(*) Notice: Subject to any disclaimer, the term of this patent is extended or adjusted under 35 U.S.C. 154(b) by 547 days.

This patent is subject to a terminal disclaimer.

(21) Appl. No.: 13/465,552

(22) Filed: May 7, 2012

(65) Prior Publication Data

US 2012/0311064 A1 Dec. 6, 2012

Related U.S. Application Data

(60) Provisional application No. 61/483,607, filed on May 6, 2011.

(51) Int. Cl.
| | |
|---|---|
| G06F 15/167 | (2006.01) |
| H04M 15/00 | (2006.01) |
| H04L 12/14 | (2006.01) |
| H04W 48/18 | (2009.01) |
| H04W 88/18 | (2009.01) |
| H04W 8/12 | (2009.01) |

(52) U.S. Cl.
CPC ....... *H04M 15/8044* (2013.01); *H04L 12/1403* (2013.01); *H04L 12/1407* (2013.01); *H04M 15/66* (2013.01); *H04W 48/18* (2013.01); *H04W 8/12* (2013.01); *H04W 88/182* (2013.01)

(58) Field of Classification Search
CPC .................. H04L 67/2842; H04W 88/182
See application file for complete search history.

(56) References Cited

U.S. PATENT DOCUMENTS

| | | | |
|---|---|---|---|
| 1,872,857 A | 4/1931 | Wesson et al. | |
| 6,298,383 B1 | 10/2001 | Gutman et al. | |

(Continued)

FOREIGN PATENT DOCUMENTS

| | | |
|---|---|---|
| CN | 101483826 A | 7/2009 |
| CN | ZL 201080065174.6 | 6/2015 |

(Continued)

OTHER PUBLICATIONS

Book "The 3G IP Multimedia Subsystem" (second edition, 2006) to Camarillo et al. ("Camarillo").*

(Continued)

*Primary Examiner* — June Sison
(74) *Attorney, Agent, or Firm* — Jenkins, Wilson, Taylor & Hunt, P.A.

(57) ABSTRACT

According to one aspect, the subject matter described herein includes a method for caching call session control function (CSCF) data at a Diameter signaling router (DSR). The method includes steps occurring at a DSR network node comprising a communication interface, a processor, and a memory. The steps include receiving, via the communication interface, a Diameter message associated with a network subscriber. The steps also include identifying, by the processor, a CSCF associated with the network subscriber based on the Diameter message. The steps further include storing, in the memory, a record associating the CSCF and the network subscriber.

15 Claims, 9 Drawing Sheets

(56) References Cited

U.S. PATENT DOCUMENTS

| | | |
|---|---|---|
| 7,292,592 B2 | 11/2007 | Rune |
| 7,319,857 B2* | 1/2008 | Baldwin et al. ............ 455/412.1 |
| 7,551,926 B2 | 6/2009 | Rune |
| 7,844,745 B1 | 11/2010 | Darbyshire et al. |
| 7,916,685 B2 | 3/2011 | Schaedler et al. |
| 8,015,293 B2 | 9/2011 | Schaedler et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,918,469 B2 | 12/2014 | Sprague et al. |
| 8,942,747 B2 | 1/2015 | Marsico |
| 9,059,948 B2 | 6/2015 | Schaedler et al. |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1* | 8/2004 | Yla-Outinen et al. ........ 455/453 |
| 2004/0205212 A1* | 10/2004 | Huotari et al. ................ 709/230 |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2005/0235000 A1 | 10/2005 | Keil |
| 2006/0002308 A1 | 1/2006 | Na et al. |
| 2006/0030320 A1 | 2/2006 | Tammi et al. |
| 2006/0045249 A1* | 3/2006 | Li et al. .................... 379/126 |
| 2006/0068762 A1* | 3/2006 | Baldwin et al. ............ 455/412.1 |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0189215 A1 | 8/2007 | Wu et al. |
| 2007/0242637 A1 | 10/2007 | Dynarski et al. |
| 2007/0297419 A1* | 12/2007 | Askerup et al. .......... 370/395.52 |
| 2008/0039104 A1 | 2/2008 | Gu et al. |
| 2008/0256251 A1 | 10/2008 | Huotari et al. |
| 2009/0080440 A1 | 3/2009 | Balyan et al. |
| 2009/0089435 A1 | 4/2009 | Terrill et al. |
| 2009/0129271 A1 | 5/2009 | Ramankutty et al. |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0221310 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0268814 A1* | 10/2010 | Cross et al. ................... 709/224 |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0158090 A1 | 6/2011 | Riley et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Graig et al. |
| 2011/0202676 A1 | 8/2011 | Craig et al. |
| 2011/0225113 A1 | 9/2011 | Mann |
| 2011/0225280 A1 | 9/2011 | Delsesto et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1* | 4/2012 | Alonso Alarcon et al. ... 719/318 |
| 2012/0096177 A1 | 4/2012 | Rasanen |
| 2012/0124220 A1 | 5/2012 | Zhou et al. |
| 2012/0155389 A1 | 6/2012 | McNamee et al. |
| 2012/0155470 A1 | 6/2012 | McNamee et al. |
| 2012/0201203 A1* | 8/2012 | Miyagawa et al. ........... 370/328 |
| 2012/0202550 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1* | 9/2012 | Wallace et al. ............... 370/401 |
| 2012/0239771 A1 | 9/2012 | Rasanen |
| 2013/0304843 A1* | 11/2013 | Chow et al. ................... 709/213 |
| 2014/0207941 A1 | 7/2014 | McCann |
| 2014/0258423 A1 | 9/2014 | Schaedler et al. |

FOREIGN PATENT DOCUMENTS

| | | |
|---|---|---|
| EP | 1 357 720 A1 | 10/2003 |
| EP | 1 630 999 A1 | 3/2006 |
| EP | 2 107 725 A1 | 10/2009 |
| EP | 2 242 205 A1 | 10/2010 |
| EP | 1 846 832 B1 | 4/2012 |
| EP | 2 466 828 A1 | 6/2012 |
| JP | H11-224219 A | 8/1999 |
| JP | 4041038 B2 | 1/2008 |
| JP | 2010-0278884 A | 12/2010 |
| JP | 2013-527999 T | 7/2013 |
| WO | WO 2004/064442 A1 | 7/2004 |
| WO | WO 2006/066149 A2 | 6/2006 |
| WO | WO 2009/070179 A1 | 6/2009 |
| WO | WO 2010/139360 A1 | 12/2010 |
| WO | WO 2011/082090 A2 | 7/2011 |
| WO | 2 220 841 B1 | 9/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

Notice of Allowance and Fee(s) Due for U.S. Appl. No. 13/409,914 (Apr. 25, 2014).

Supplemental Notice of Allowability for U.S. Appl. No. 13/409,949 (Apr. 24, 2014).

Non-Final Office Action for U.S. Appl. No. 13/366,928 (Mar. 21, 2014).

Commonly-assigned, co-pending Divisional U.S. Appl. No. 14/190,071 for "Methods, Systems, and Computer Program Products for Clustering and Communicating Between Internet Protocol Multimedia Subsystem (IMS) Entities and for Supporting Database Access in an IMS Network Environment," (Unpublished, filed Feb. 25, 2014).

(56) References Cited

OTHER PUBLICATIONS

Non-Final Office Action for U.S. Appl. No. 13/192,410 (Feb. 20, 2014).
Advisory Action Before the Filing of an Appeal Brief for U.S. Appl. No. 13/366,928 (Feb. 10, 2014).
Extended European Search Report for European Application No. 10841605.8 (Feb. 3, 2014).
Notice of Allowance and Fee(s) Due for U.S. Appl. No. 13/409,949 (Jan. 14, 2014).
Final Office Action for U.S. Appl. No. 13/409,914 (Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (Dec. 11, 2013).
Communication of European publication number and information on the application of Article 67(3) EPC for European Application No. 12751783.7 (Dec. 11, 2013).
Communication of European publication number and information on the application of Article 67(3) EPC for European Application No. 12751812.4 (Dec. 11, 2013).
Communication of European publication number and information on the application of Article 67(3) EPC for European Application No. 12741984.4 (Nov. 13, 2013).
Declaration of Mark Kanode for U.S. Appl. No. 13/409,893 (Nov. 1, 2013).
Advisory Action for U.S. Appl. No. 13/192,410 (Oct. 24, 2013).
Final Office Action for U.S. Appl. No. 13/366,928 (Oct. 23, 2013).
Applicant-Initiated Interview Summary for U.S. Appl. No. 13/192,410 (Oct. 18, 2013).
Final Office Action for U.S. Appl. No. 13/409,949 (Sep. 19, 2013).
Advisory Action Before the Filing of an Appeal Brief for U.S. Appl. No. 13/409,893 (Sep. 13, 2013).
Notice of Allowance and Fee(s) Due for U.S. Appl. No. 12/974,869 (Aug. 19, 2013).
Final Office Action for U.S. Appl. No. 13/192,410 (Aug. 5, 2013).
Final Office Action for U.S. Appl. No. 13/409,893 (Jul. 1, 2013).
Non-Final Office Action for U.S. Appl. No. 13/409,914 (Jun. 7, 2013).
Notice of Allowance and Fee(s) Due for U.S. Appl. No. 13/412,352 (May 28, 2013).
Non-Final Office Action for U.S. Appl. No. 13/366,928 (Mar. 26, 2013).
Non-Final Office Action for U.S. Appl. No. 13/409,949 (Feb. 15, 2013).
"3rd Generation Partnership Project; Technical Specification Group Services and System Aspects; Policy and charging control architecture (Release 9)," 3GPP TS 23.203, V9.3.0 (Dec. 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
Rouse, "Platform," http://searchservervirtualization.techtarget.com/definition/platform, pp. 1-2 (2006-2009).
Notice of Allowance and Fee(s) Due for U.S. Appl. No. 13/366,928 (Jan. 7, 2013).
Non-Final Office Action for U.S. Appl. No. 13/192,410 (Dec. 20, 2012).
Non-Final Office Action for U.S. Appl. No. 13/409,893 (Dec. 13, 2012).
Commonly-assigned, co-pending U.S. Appl. No. 13/712,481 for "Methods, Systems, and Computer Readable Media for Encrypting Diameter Identification Information in a Communication Network," (Unpublished, filed Dec. 12, 2012).
Calhoun et al., "Diameter Base Protocol," draft-ietf-aaa-diameter-07, Section 6.3, p. 68 (Jul. 2001).
Non-Final Official Action for U.S. Appl. No. 12/409,914 (Nov. 6, 2012).
Notification of Transmittal of the International Search Report and the Written Opinion of the International Searching Authority, or the Declaration for International Patent Application No. PCT/US2012/036784 (Nov. 1, 2012).
Non-Final Official Action for U.S. Appl. No. 13/412,352 (Oct. 26, 2012).
Communication of European publication number and information on the application of Article 67(3) EPC for European Patent Application No. 10841605.8 (Oct. 17, 2012).
Notification of Transmittal of the International Search Report and the Written Opinion of the International Searching Authority, or the Declaration for International Patent Application No. PCT/US2012/027281 (Jun. 15, 2012).
Notification of Transmittal of the International Search Report and the Written Opinion of the International Searching Authority, or the Declaration for International Application No. PCT/US2012/027263 (Jun. 14, 2012).
Notification of Transmittal of the International Search Report and the Written Opinion of the International Searching Authority, or the Declaration for International Patent Application No. PCT/US2012/027736 (Jun. 12, 2012).
Notification of Transmittal of the International Search Report and the Written Opinion of the International Searching Authority, or the Declaration for International Patent Application No. PCT/US2012/023971 (Jun. 11, 2012).
Notification of Transmittal of the International Search Report and the Written Opinion of the International Searching Authority, or the Declaration for International Patent Application No. PCT/US2012/027269 (Jun. 11, 2012).
PCT International Patent Application No. PCT/US2012/036784, Titled, "Methods, Systems, and Computer Readable Media for Steering a Subscriber Between Access Networks," (Unpublished, Filed May 7, 2012).
Decision to grant a European patent pursuant to Article 97(1) EPC for European Application No. 05854512.0 (Mar. 15, 2012).
Notification of Transmittal of the International Search Report and the Written Opinion of the International Searching Authority, or the Declaration for International Application No. PCT/US2011/039285 (Feb. 9, 2012).
Communication under Rule 71(3) EPC for European application No. 05854512.0 (Nov. 11, 2011).
Notification of the Transmittal of the International Search Report and the Written Opinion of the International Searching Authority, or the Declaration for International Application No. PCT/US2010/061934 (Oct. 25, 2011).
Notice of Allowance and Fee(s) Due for U.S. Appl. No. 11/303,757 (May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
Official Action for U.S. Appl. No. 11/303,757 (Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0 (Dec. 2010).
Communication pursuant to Article 94(3) EPC for European Application No. 05 854 512.0 (Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0 (Oct. 2010).
"3rd Generation Partnership Project; Technical Specification Group Services and System Aspects; Telecommunication management;

(56) References Cited

OTHER PUBLICATIONS

Charging management; Packet Switched (PS) domain charging (Release 9)," 3GPP TS 32.251, V9.4.0 (Oct. 2010).
"3rd Generation Partnership Project; Technical Specification Group Services and System Aspects; Telecommunication management; Charging management; Diameter charging applications (Release 9)," 3GPP TS 32.299, V9.4.0 (Jun. 2010).
"3rd Generation Partnership Project; Technical Specification Group Services and System Aspects; Telecommunication management; Charging management; Charging architecture and principles (Release 9)," 3GPP TS 32.240, V9.1.0 (Jun. 2010).
Znaty, "Diameter, GPRS, (LTE + ePC = EPS), IMS, PCC and SDM," EFORT, pp. 1-229 (Part 1 of 2) (May 2010).
Znaty, "Diameter, GPRS, (LTE + ePC = EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0 (Mar. 2010).
Communication pursuant to Article 94(3) EPC for European Application No. 05854512.0 (Feb. 8, 2010).
Final Official Action for U.S. Appl. No. 11/303,757 (Dec. 9, 2009).
Supplementary European Search Report for European Application No. 05854512.0 (Nov. 17, 2009).
Official Action for U.S. Appl. No. 11/303,757 (May 28, 2009).
Final Official Action for U.S. Appl. No. 11/303,757 (Oct. 6, 2008).
Official Action for U.S. Appl. No. 11/303,757 (May 7, 2008).
Notification of Transmittal of the International Search Report and the Written Opinion corresponding to International Application No. PCT/US05/45813 (Mar. 24, 2008).
Official Action for U.S. Appl. No. 11/303,757 (Feb. 21, 2008).
Restriction Requirment for U.S. Appl. No. 11/303,757 (Oct. 4, 2007).
"Tekelec Announces TekCore IMS Core Platform," (Jun. 5, 2006).
"Operator Guidebook to IMS and New Generation Networks and Services," www.morianagroup.com, Second Edition (Feb. 2006).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture (Aug. 20, 2004).
"IP Multimedia Subsystem IMS Over and Applications," 3G Americas, pp. 1-17 (Jul. 2004).
"3rd Generation Partnership Project; technical Specification Group Core Network; IP Multimedia (IM) Session Handling; IM Call Model; Stage 2 (Release 6)," 3GPP TS 23.218, V6.1.0,pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 XS0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
Calhoun et al., "Diameter Base Protocol," RFC 3588, pp. 1-147 (Sep. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
Howard, "Sipping IETF51 3GPP Security and Authentication," http://www3.ietf.org/proceedings/01aug/slides/sipping-7/index.htm (Dowloaded from Internet on Dec. 16, 2005) (Sep. 13, 2001).
Narten et al., "Privacy Extensions for Stateless Address Autoconfiguration in IPv6," RFC 3041, pp. 1-16 (Jan. 2001).
Faltstrom, "E.164 Number and DNS," RFC 2916, pp. 1-10 (Sep. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01 (Jan. 1998).
Jalava, "Service Routing in 3GPP IP Multimedia Subsystem," Nokia, pp. 1-16 (Publication Date Unknown).
Notice of Allowance and Fee(s) Due and Examiner-Initiated Interview Summary for U.S. Appl. No. 13/192,410 (Feb. 12, 2015).
Notice of Panel Decision from Pre-Appeal Brief Review for U.S. Appl. No. 13/192,410 (Feb. 4, 2015).
Extended European Search Report for European Patent Application No. 12751986.6 (Jan. 20, 2015).
Non-Final Office Action for U.S. Appl. No. 13/748,547 (Jan. 5, 2015).
Supplemental Notice of Allowability for U.S. Appl. No. 13/366,928 (Dec. 26, 2014).
Letter Regarding Office Action for Japanese Patent Application No. 2013-556675 (Sep. 30, 2014).
Final Office Action for U.S. Appl. No. 13/192,410 (Sep. 25, 2014).
First Office Action for Japanese Application No. 2013-556857 (Sep. 24, 2014).
Notice of Allowance and Fee(s) Due for U.S. Appl. No. 13/366,928 (Sep. 3, 2014).
Extended European Search Report for European Application No. 12752952.7 (Aug. 27, 2014).
Notification of the First Office Action for Chinese Application No. 201080065174.6 (Aug. 13, 2014).
Extended European Search Report for European Application No. 12751783.7 (Jul. 22, 2014).
Extended European Search Report for European Application No. 12751812.4 (Jul. 16, 2014).
Notice of Allowance and Fee(s) Due for U.S. Appl. No. 13/409,893 (Jul. 10, 2014).
Notification of Transmittal of the International Search Report and the Written Opinion of the International Searching Authority, or the Declaration for International Patent Application No. PCT/US2014/011548 (Mar. 28, 2014).
Communication of European publication number and information on the application of Article 67(3) EPC for European Application No. 12781800.3 (Feb. 12, 2014).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Liu et al., "IBM Technical Library, Introduction to Diameter," pp. 1-9, http://www.ibm.com/developerworks/wireless/library/wi-diameter (Jan. 24, 2006).

(56) References Cited

OTHER PUBLICATIONS

Final Office Action for U.S. Appl. No. 13/748,547 (Aug. 10, 2015).
Letter Regarding Office Action for Japanese Patent Application No. 2013-556860 (Jul. 21, 2015).
Non-Final Office Action for U.S. Appl. No. 14/190,071 (Jul. 8, 2015).
Letter Regarding Publication of Patent for Japanese Patent Application No. 2013-556675 (Jun. 10, 2015).
Letter Regarding Notice of Grant for Japanese Patent Application No. 2014-509509 (Jun. 2, 2015).
Letter Regarding Notice of Grant for Japanese Patent Application No. 2013-556857 (May 26, 2015).
Decision to Grant for Chinese Patent Application No. 201080065174.6 (Apr. 16, 2015).
Second Office Action for Japanese Patent Application No. 2013-556857 (Apr. 14, 2015).
Letter Regarding Notice of Grant for Japanese Patent Application No. 2013-556675 (Mar. 31, 2015).
Letter Regarding Office Action for Japanese Patent Application No. 2013-556855 (Feb. 24, 2015).

* cited by examiner

METHODS, SYSTEMS, AND COMPUTER READABLE MEDIA FOR CACHING CALL SESSION CONTROL FUNCTION (CSCF) DATA AT A DIAMETER SIGNALING ROUTER (DSR)

PRIORITY CLAIM

This application claims the benefit of U.S. Provisional Patent Application Ser. No. 61/483,607, filed May 6, 2011; the disclosure of which is incorporated herein by reference in its entirety.

TECHNICAL FIELD

The subject matter described herein relates to caching call session control function (CSCF) data at a Diameter signaling router (DSR). More specifically, the subject matter relates to methods, systems, and computer readable media for caching CSCF data at a DSR.

BACKGROUND

The Diameter protocol is a next generation authentication, authorization, and accounting (AAA) protocol. The Diameter base protocol is defined in IETF RFC 3588, the disclosure of which is incorporated by reference herein in its entirety. Commonly used within the Internet multimedia subsystem (IMS) architecture, the Diameter protocol was derived from the remote authentication dial-in user service (RADIUS) protocol. Historically, the RADIUS protocol was employed by Internet service providers (ISPs) to provide a secure communication channel between an ISP's access server and a secure location where user credential information was stored, e.g., a lightweight directory access protocol (LDAP) server. While the RADIUS protocol provided a standardized AAA exchange protocol, the emergence of new technologies and applications necessitated the development of a protocol capable of meeting ever-changing demands. Diameter aims to extend the standardized approach of RADIUS while providing expanded functionality and remaining open to future development.

Modern telecommunication architectures, such as the IMS architecture, often employ CSCFs as proxies to process signaling messages and interface the transport, control, and application planes. CSCFs serve as intermediary entities within the network architecture, supporting the registration of subscribers and the establishment of sessions between subscribers. While the utilization of CSCFs provides network operators with the ability to flexibly establish inter-network sessions, their use is also associated with overhead. For example, registering a network subscriber within a network and/or establishing a session for a network subscriber may require significant inter-node messaging to determine an appropriate CSCF for the subscriber. A reduction in the amount of inter-node messaging associated with identifying a CSCF may thereby increase network performance.

Accordingly, a need exists for methods, systems, and computer readable media for caching CSCF data at a DSR.

SUMMARY

According to one aspect, the subject matter described herein includes a method for caching CSCF data at a DSR. The method includes steps occurring at a DSR network node comprising a communication interface, a processor, and a memory. The steps include receiving, via the communication interface, a Diameter message associated with a network subscriber. The steps also include identifying, by the processor, a CSCF associated with the network subscriber based on the Diameter message. The steps further include storing, in the memory, a record associating the CSCF and the network subscriber.

According to another aspect, the subject matter described herein includes a system for caching CSCF data at a DSR. The system includes a DSR network node. The DSR network node includes a communication interface configured to receive a Diameter message associated with a network subscriber. The DSR network node also includes a caching module configured to identify a CSCF associated with the network subscriber based on the Diameter message and store a record associating the CSCF and the network subscriber.

As used herein, the term "node" refers to a physical computing platform including one or more processors and memory.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
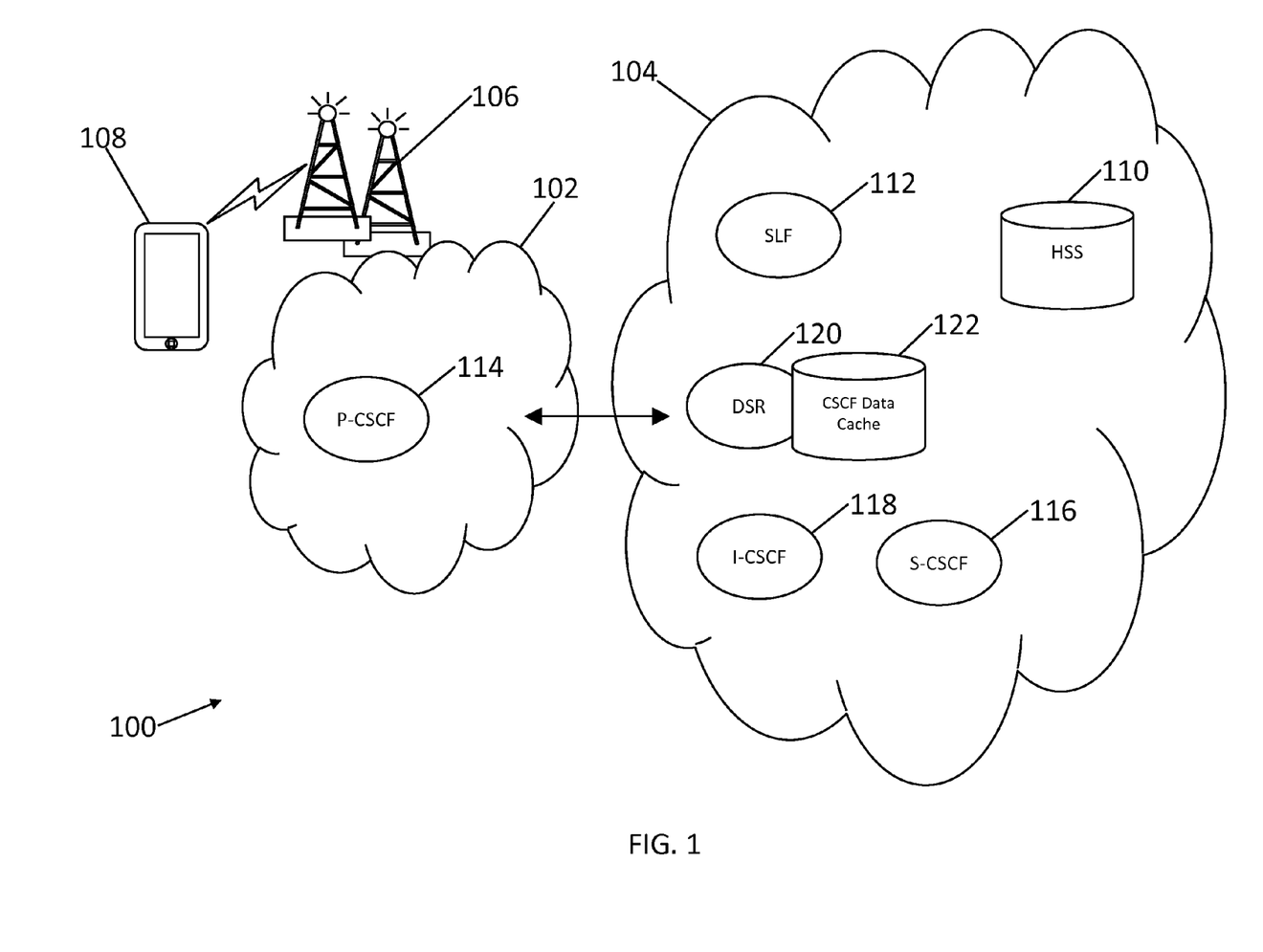
FIG. 1 is a network diagram illustrating an exemplary network environment for caching CSCF data at a DSR in accordance with embodiments of the subject matter described herein.

Methods, systems, and computer readable media for caching CSCF data at a DSR are provided. FIG. 1 is a network diagram illustrating an exemplary network environment for caching CSCF data at a DSR in accordance with embodiments of the subject matter described herein. Referring to FIG. 1, network environment 100 may include one or more networks. For example, network environment 100 may include visited network 102 and home network 104. Visited network 102 may be a radio access network (RAN) and may include transceiver/receiver nodes 106 for supporting wireless communications for a network subscriber utilizing mobile device 108. For example, visited network 102 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IP-CAN), a code division multiple access (CDMA) network, an evolution-data optimized (EV-DO) network, a wideband CDMA (WCDMA) network, a high speed packet access (HPSA) network, an evolved HPSA (EHPSA+) network, a long term evolution (LTE) access network, or any other network technology for supporting communications within network environment 100. Mobile device 108 may be a computer, a pager, a mobile phone, a smartphone, a wireless modem, and/or any other device through which a network subscriber may access network resources and/or services within network environment 100.

Home network 104 may be associated with a network subscriber utilizing mobile device 108 and may include one or more nodes for supporting such a subscriber. For example, home network 104 may include home subscriber server (HSS) node 110. HSS node 110 may store information related to network subscribers associated with home network 104 (e.g., a master subscriber database and/or associated subscriber profiles). HSS node 110 may also perform authentication and/or authorization for subscribers associated with home network 104 and may maintain and/or provide information about a particular network subscriber's current location within network environment 100 and/or one or more network addresses associated with such a subscriber. Home network 104 may also contain one or more network nodes for implementing a subscriber location function (SLF). For example, home network 104 may include SLF node 112. SLF node 112 may be utilized to identify a particular HSS associated with a subscriber when more than one HSS is associated with home network 104. For example, SLF node 112 may identify that HSS node 110 is associated with a subscriber utilizing mobile device 108.

Visited network 102 and/or home network 104 may also contain one or more network nodes for implementing one or more CSCFs. For example, visited network 102 may include proxy-CSCF (P-CSCF) node 114. P-CSCF node 114 may serve as a first point of contact for devices supporting one or more network subscribers in visited network 102. It will be appreciated that one or more P-CSCF nodes may be located in home network 104 as well as visited network 102 and that P-CSCF node 114 is located in visited network 102 for the purpose of an exemplary illustration. In some embodiments, P-CSCF node 114 may be a session border controller (SBC). Home network 104 may include one or more network nodes for implementing one or more serving-CSCFs (S-CSCFs). For example, home network 104 may include S-CSCF node 116. S-CSCF node 116 may serve as a central node for the signaling plane, serving not only as a proxy server (e.g., a session initiation protocol (SIP) proxy) but also as a session control point. S-CSCF node 116 may handle registration functions for subscribers of home network 104 and may bind subscriber information. For example, S-CSCF node 116 may bind an Internet layer address (e.g., an Internet protocol (IP) address) to one or more application layer addresses (e.g., a SIP address). Home network 104 may further include one or more network nodes for implementing one or more interrogating-CSCFs (I-CSCFs). For example, home network 104 may include I-CSCF node 118. I-CSCF node 118 may be associated with a publicly available network address and may serve as a forwarding point for network traffic associated with home network 104.

HSS node 110, SLF node 112, P-CSCF node 114, S-CSCF node 116, I-CSCF node 118, and/or one or more other network nodes (not illustrated) may communicate AAA information within network environment 100 using the Diameter protocol and network environment 100 may include one or more specialized network nodes for routing Diameter messages within network environment 100. For example, home network 104 may include DSR node 120. In some embodiments, DSR node 120 may function as a Diameter routing agent, a Diameter proxy agent, and/or a Diameter translation agent for Diameter messages within network environment 100. In accordance with embodiments of the subject matter described herein, DSR node 120 may be configured to cache CSCF data. For example, DSR node 120 may be configured to receive a Diameter message associated with a network subscriber (e.g., a network subscriber utilizing mobile device 108), identify a CSCF associated with the network subscriber (e.g., S-CSCF node 116) based on the Diameter message, and store a record associating the CSCF with the network subscriber. In some embodiments, DSR node 120 may include and/or be associated with a CSCF data cache for storing such records. For example, DSR node 120 may include CSCF data cache 122. As will be described in greater detail below, DSR node 120 may further be configured to utilize cached CSCF data to answer Diameter request messages associated with the network subscriber and/or to route messages associated with the network subscriber.

Figure 2A:
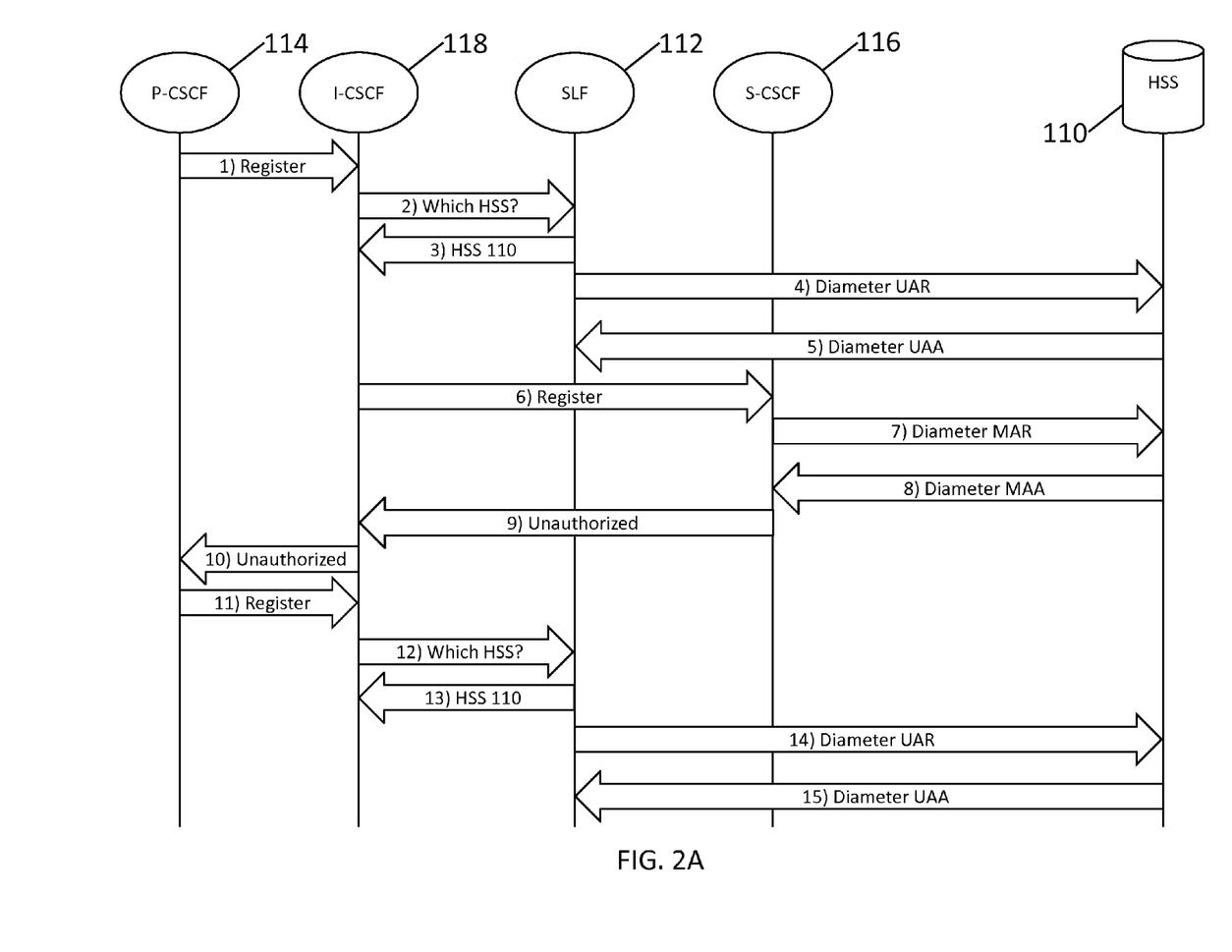
FIGS. 2A and 2B are respectively first and second portions of an exemplary message sequence for network subscriber registration and session establishment.
Figure 2B:
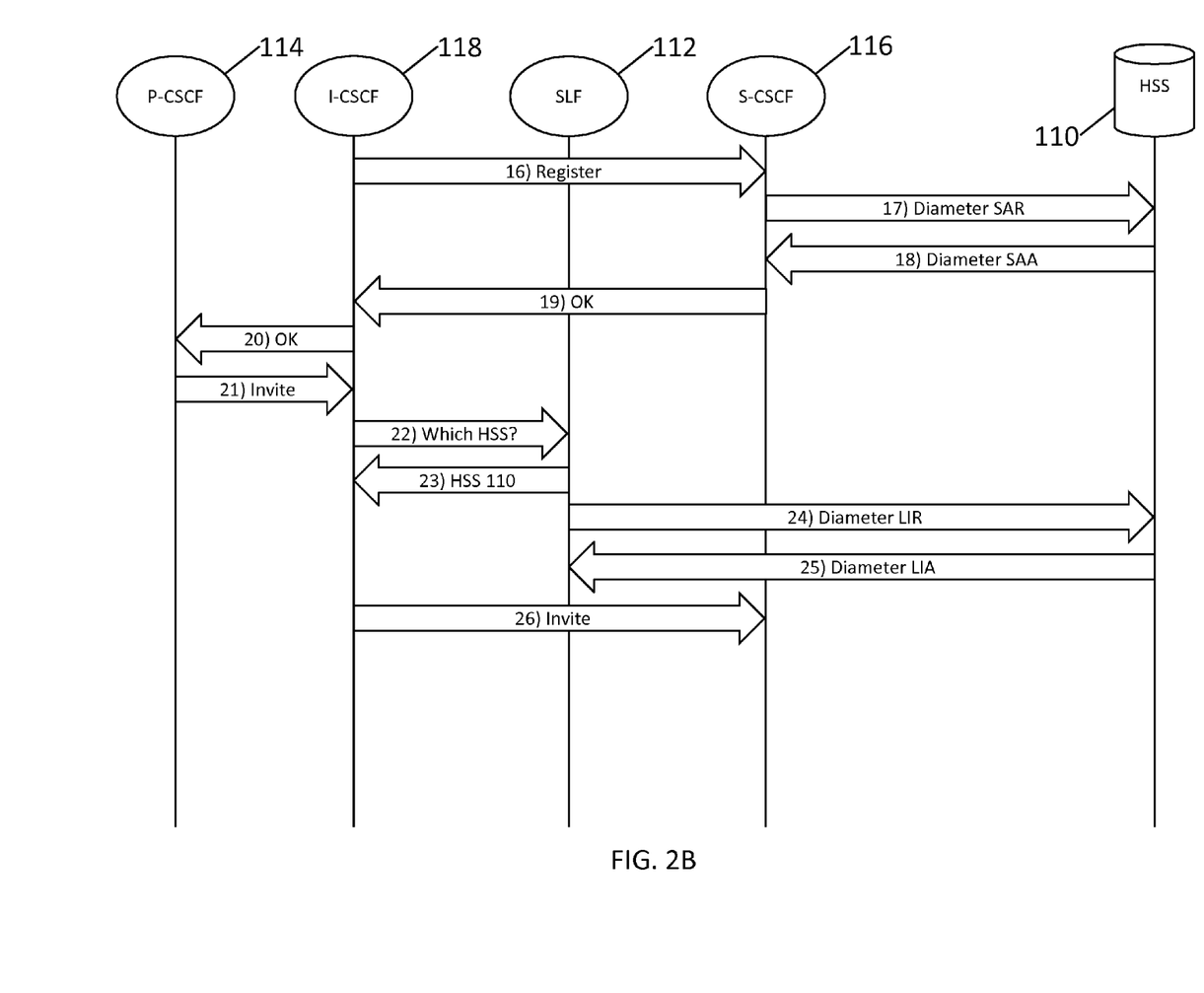

FIGS. 2A and 2B are respectively first and second portions of an exemplary message sequence for network subscriber registration and session establishment. Referring to FIG. 2A, at step 1, P-CSCF node 114 may initiate registration by sending a register request message (e.g., a SIP register request message) associated with a network subscriber (e.g., a network subscriber utilizing mobile device 108) to I-CSCF node 118. At step 2, I-CSCF node 118 may query SLF node 112 to determine which HSS is associated with the network subscriber. At step 2, SLF node 112 may respond to I-CSCF node 118's query with a response identifying HSS node 110 as the HSS serving the network subscriber. At step 4, SLF node 112 may send a Diameter user authorization request (UAR) message to HSS node 110 requesting authorization for the routing of the register request. At step 5, HSS node 110 may respond to SLF node 112's Diameter UAR message with a Diameter user authorization answer (UAA) message indicating that the routing of the register request is authorized. At step 6, I-CSCF node 118 may route the register request message to S-CSCF node 116. At step 7, S-CSCF node 116 may send a Diameter multimedia authorization request (MAR) message to HSS node 110 requesting authorization to utilize a service. At step 8, HSS node 110 may respond to S-CSCF node 116's Diameter MAR message with a Diameter multimedia authorization answer (MAA) message indicating that the request to utilize the service is denied. At step 9, S-CSCF node 116 may send a message to I-CSCF node 118 indicating that the request is unauthorized. At step 10, I-CSCF node 118 may notify P-CSCF node 114 that the request was not authorized. At step 11, P-CSCF node 114 may send a new register request message to I-CSCF node 118. At step 12, I-CSCF node 118 may query SLF node 112 to determine which HSS is associated with the network subscriber. At step 13, SLF node 112 may respond to I-CSCF node 118's query with a response identifying HSS node 110 as the HSS serving the network subscriber. At step 14, SLF node 112 may send a Diameter UAR message to HSS node 110 requesting authorization for the routing of the register request. At step 15, HSS node 110 may respond to SLF node 112's Diameter UAR message with a Diameter UAA message indicating that the routing of the register request is authorized.

Referring to FIG. 2B, at step 16, I-CSCF node 118 may route the register request message to S-CSCF node 116. At step 17, S-CSCF node 116 may send a Diameter server assignment request (SAR) message to HSS node 110 indicating the completion of the authorization process and requesting the storage of a record indicating the CSCF serving the network subscriber (e.g., S-CSCF node 116). At step 18, HSS node 110 may respond to S-CSCF node 116's Diameter SAR message with a Diameter server assignment answer (SAA) message indicating that the assignment has been successfully stored. At step 19, S-CSCF node 116 may send a message to I-CSCF node 118 indicating that the registration was successful. At step 20, I-CSCF node 118 may notify P-CSCF node 114 that the registration was successful. At step 21, P-CSCF node 114 may initiate the establishment of a session for the subscriber by sending an invite message (e.g., a SIP invite message) to I-CSCF node 118. At step 22, I-CSCF node 118 may query SLF node 112 to determine which HSS is associated with the network subscriber. At step 23, SLF node 112 may respond to I-CSCF node 118's query with a response identifying HSS node 110 as the HSS serving the network subscriber. At step 24, SLF node 112 may send a Diameter location information request (LIR) message to HSS node 110 requesting information (e.g., a SIP uniform resource identifier (URI)) associated with the CSCF serving the subscriber. At step 25, HSS node 110 may respond to SLF node 112's Diameter LIR message with a Diameter location information answer (LIA) message identifying the CSCF serving the network subscriber (e.g., S-CSCF node 116.) At step 26, I-CSCF node 118 may route the invite message to S-CSCF node 116. As the foregoing description illustrates, the registration of a network subscriber within network environment 100 and the establishment of a session for the network subscriber is associated with a significant amount of inter-node Diameter messaging. As will be described in greater detail below, the utilization of a DSR node configured to cache CSCF data, such as DSR node 120, may reduce the amount of inter-node Diameter messaging required and may thereby increase network performance.

Figure 3A:
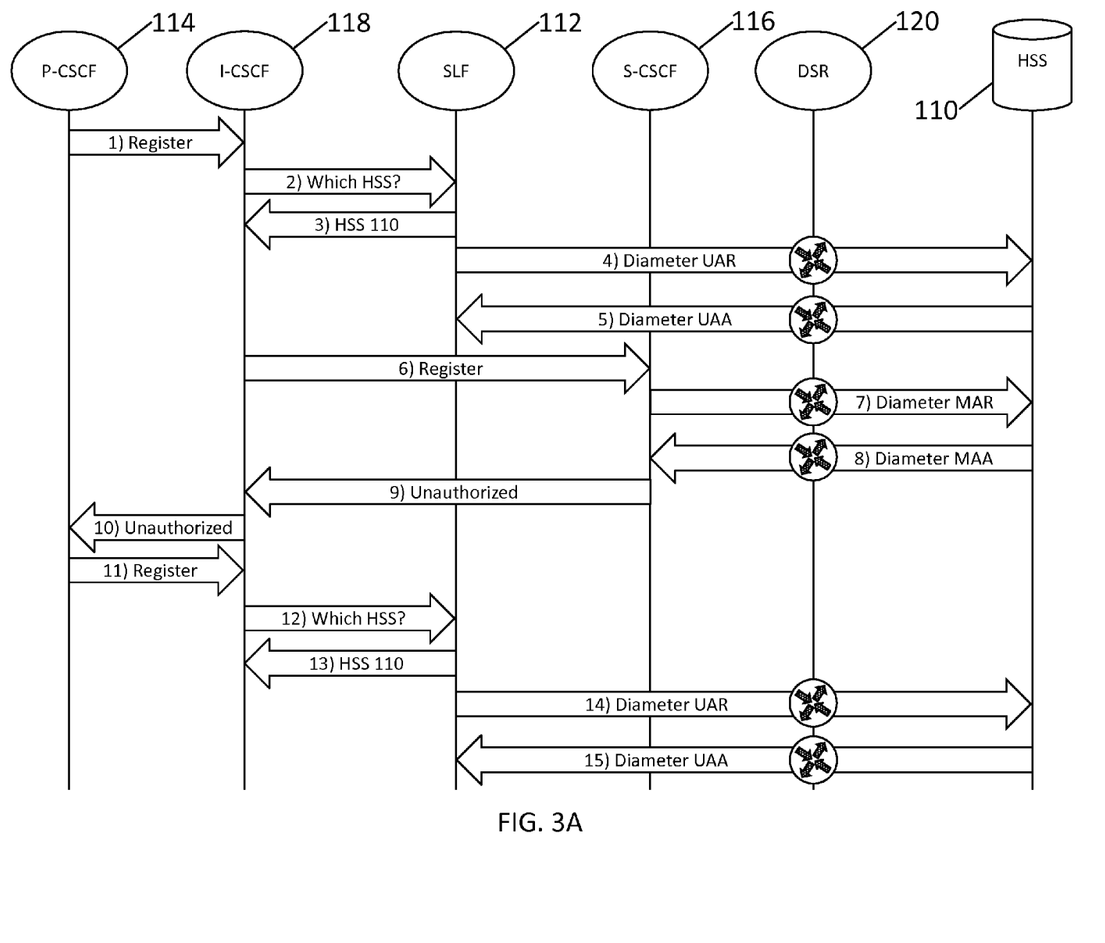
FIGS. 3A and 3B are respectively first and second portions of an exemplary message sequence for network subscriber registration and session establishment in which CSCF data is cached at a DSR and utilized to respond to a Diameter request in accordance with embodiments of the subject matter described herein.
Figure 3B:
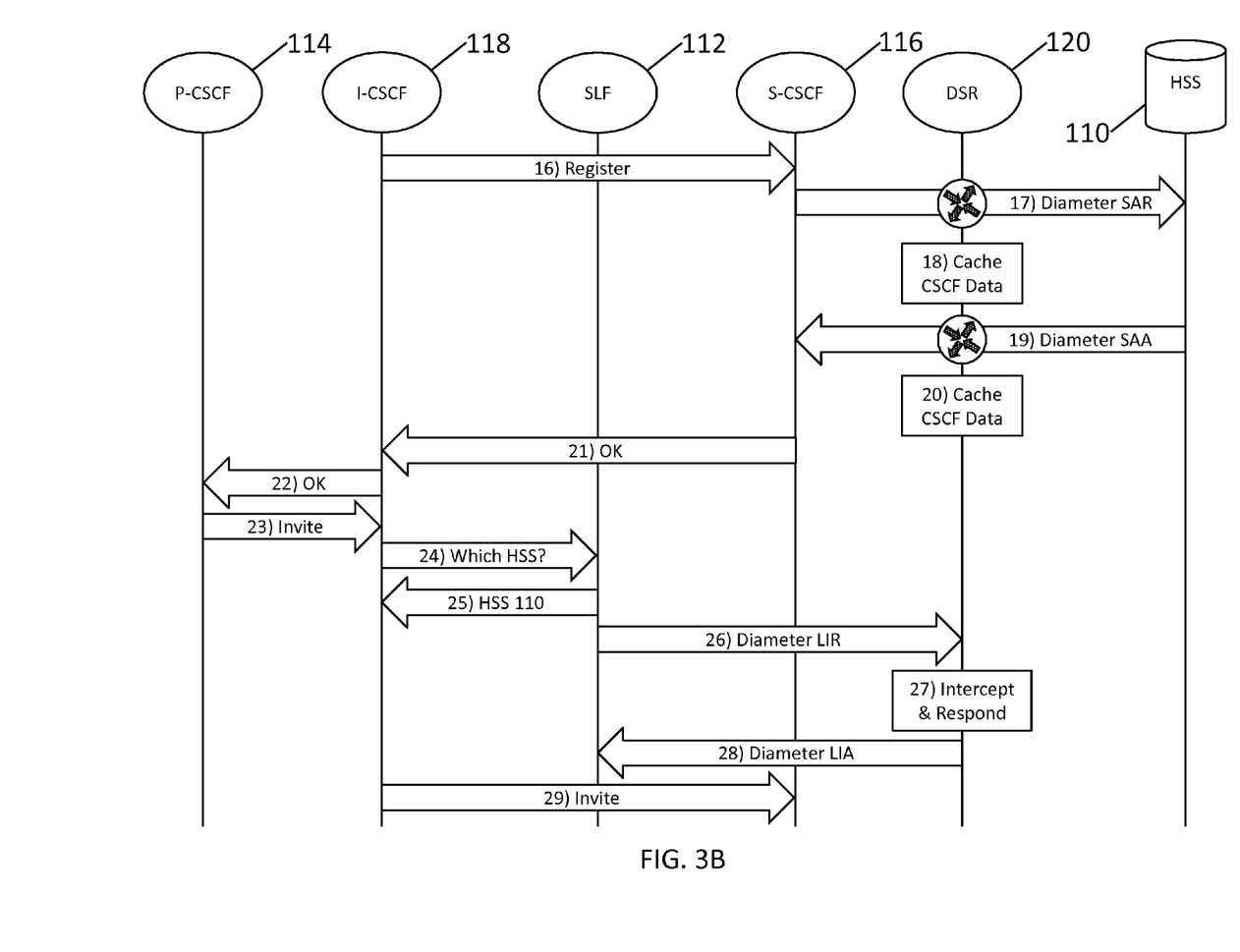

FIGS. 3A and 3B are respectively first and second portions of an exemplary message sequence for network subscriber registration and session establishment in which CSCF data is cached at a DSR and utilized to respond to a Diameter request in accordance with embodiments of the subject matter described herein. Referring to FIG. 3A, at step 1, P-CSCF node 114 may initiate registration by sending a register request message (e.g., a SIP register request message) associated with a network subscriber (e.g., a network subscriber utilizing mobile device 108) to I-CSCF node 118. At step 2, I-CSCF node 118 may query SLF node 112 to determine which HSS is associated with the network subscriber. At step 2, SLF node 112 may respond to I-CSCF node 118's query with a response identifying HSS node 110 as the HSS serving the network subscriber. At step 4, SLF node 112 may send a Diameter UAR message to HSS node 110 requesting authorization for the routing of the register request. DSR node 120 may be utilized to route the Diameter UAR message from SLF node 112 to HSS node 110. At step 5, HSS node 110 may respond to SLF node 112's Diameter UAR message with a Diameter UAA message indicating that the routing of the register request is authorized. DSR node 120 may be utilized to route the Diameter UAA message from HSS node 110 to SLF node 112. At step 6, I-CSCF node 118 may route the register request message to S-CSCF node 116. At step 7, S-CSCF node 116 may send a Diameter MAR message to HSS node 110 requesting authorization to utilize a service. DSR node 120 may be utilized to route the Diameter MAR message from S-CSCF node 116 to HSS node 110. At step 8, HSS node 110 may respond to S-CSCF node 116's Diameter MAR message with a Diameter MAA message indicating that the request to utilize the service is denied. DSR node 120 may be utilized to route the Diameter MAA message from HSS node 110 to S-CSCF node 116. At step 9, S-CSCF node 116 may send a message to I-CSCF node 118 indicating that the request is unauthorized. At step 10, I-CSCF node 118 may notify P-CSCF node 114 that the request was not authorized. At step 11, P-CSCF node 114 may send a new register request message to I-CSCF node 118. At step 12, I-CSCF node 118 may query SLF node 112 to determine which HSS is associated with the network subscriber. At step 13, SLF node 112 may respond to I-CSCF node 118's query with a response identifying HSS node 110 as the HSS serving the network subscriber. At step 14, SLF node 112 may send a Diameter UAR message to HSS node 110 requesting authorization for the routing of the register request. DSR node 120 may be utilized to route the Diameter UAR message from SLF node 112 to HSS node 110. At step 15, HSS node 110 may respond to SLF node 112's Diameter UAR message with a Diameter UAA message indicating that the routing of the register request is authorized. DSR node 120 may be utilized to route the Diameter UAA message from HSS node 110 to SLF node 112.

Referring to FIG. 3B, at step 16, I-CSCF node 118 may route the register request message to S-CSCF node 116. At step 17, S-CSCF node 116 may send a Diameter SAR message to HSS node 110 indicating the completion of the authorization process and requesting the storage of a record indicating the CSCF serving the network subscriber (e.g., S-CSCF node 116). DSR node 120 may be utilized to route the Diameter SAR message from S-CSCF node 116 to HSS node 110. In accordance with embodiments of the subject matter described herein, at step 18, DSR node 120 may identify a CSCF associated with the subscriber (e.g., S-CSCF node 116) based on the Diameter SAR message received from S-CSCF node 116 and routed to HSS node 110. For example, the Diameter SAR message received from S-CSCF node 116 and routed to HSS node 110 may contain a parameter identifying S-CSCF node 116. Having identified a CSCF associated with the subscriber, DSR node 120 may store a record associating the CSCF and the subscriber (e.g., a record associating S-CSCF node 116 with the network subscriber utilizing mobile device 108). For example, DSR node 120 may store such a record in CSCF data cache 122. At step 19, HSS node 110 may respond to S-CSCF node 116's Diameter SAR message with a Diameter SAA message indicating that the assignment has been successfully stored. DSR node 120 may be utilized to route the Diameter SAA message from HSS node 110 to S-CSCF node 116. In accordance with embodiments of the subject matter described herein, at step 20, DSR node 120 may identify a CSCF associated with the subscriber (e.g., S-CSCF node 116) based on the Diameter SAA message received from HSS node 110 and routed to S-CSCF node 116. For example, the Diameter SAA message received from HSS node 110 and routed to S-CSCF node 116 may contain a parameter identifying S-CSCF node 116. Having identified a CSCF associated with the subscriber, DSR node 120 may store a record associating the CSCF and the subscriber (e.g., a record associating S-CSCF node 116 with the network subscriber utilizing mobile device 108). For example, DSR node 120 may store such a record in CSCF data cache 122. At step 21, S-CSCF node 116 may send a message to I-CSCF node 118 indicating that the registration was successful. At step 22, I-CSCF node 118 may notify P-CSCF node 114 that the registration was successful.

At step 23, P-CSCF node 114 may initiate the establishment of a session for the subscriber by sending an invite message (e.g., a SIP invite message) to I-CSCF node 118. At step 24, I-CSCF node 118 may query SLF node 112 to determine which HSS is associated with the network subscriber. At step 25, SLF node 112 may respond to I-CSCF node 118's query with a response identifying HSS node 110 as the HSS serving the network subscriber. At step 26, SLF node 112 may send a Diameter LIR message to HSS node 110 requesting information (e.g., a SIP URI) associated with the CSCF serving the subscriber. In accordance with embodiments of the subject matter described herein, at step 27, DSR node 120 may intercept the Diameter LIR message en route to HSS node 110 and may utilize the record it previously stored in CSCF data cache 122 (e.g., the record associating the subscriber utilizing mobile device 108 with S-CSCF node 116) to respond to the Diameter LIR message on HSS node 110's behalf. For example, DSR node 120 may utilize the record to generate a Diameter LIA message that includes information identifying S-CSCF node 116 (e.g., a SIP URI associated with S-CSCF node 116) and, at step 28, may communicate the Diameter LIA message to SLF node 112. At step 29, I-CSCF node 118 may route the invite message to S-CSCF node 116. As the foregoing exemplary sequence illustrates, by caching CSCF data (e.g., information associating S-CSCF node 116 with the subscriber utilizing mobile device 108) at DSR node 120, DSR node 120 is able to respond to a Diameter request on HSS node 110's behalf, thereby reducing the amount of inter-node messaging required as well as the load on HSS node 110.

Figure 4A:
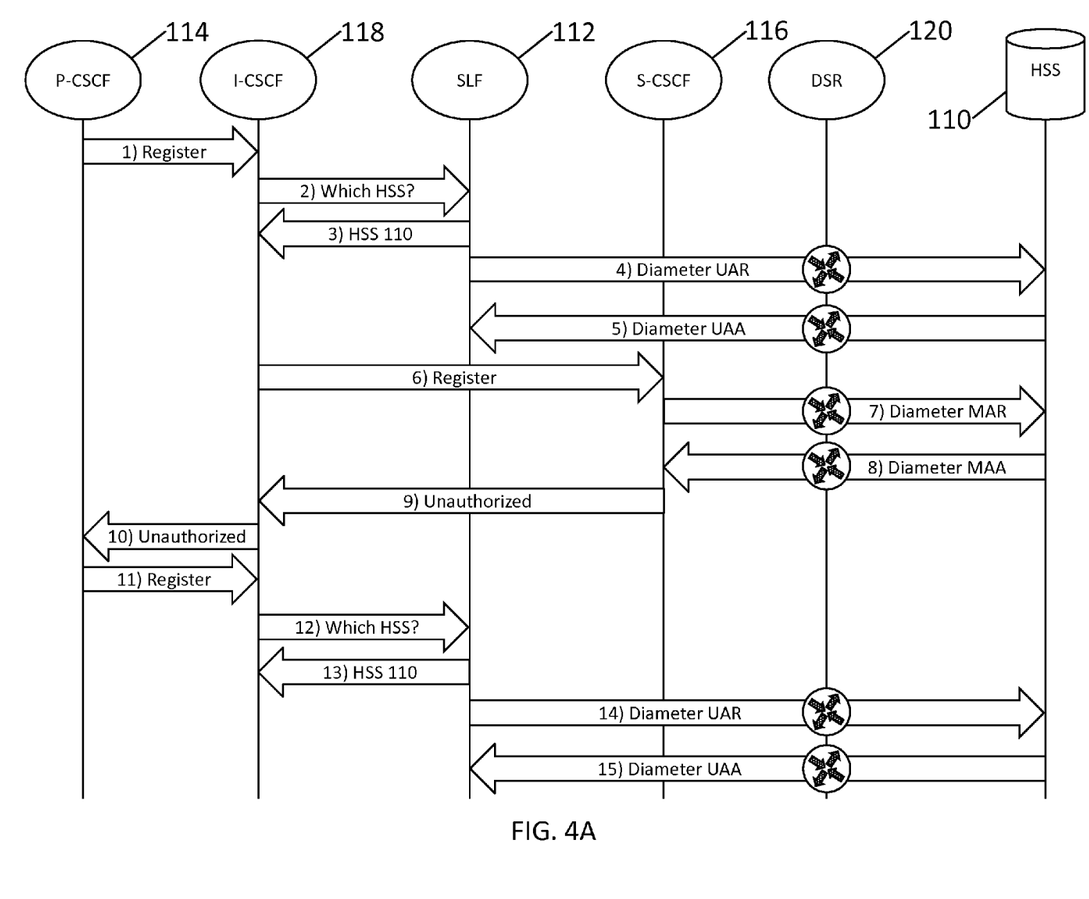
FIGS. 4A and 4B are respectively first and second portions of an exemplary message sequence for network subscriber registration and session establishment in which a message is routed by a DSR based on cached CSCF data in accordance with embodiments of the subject matter described herein.
Figure 4B:
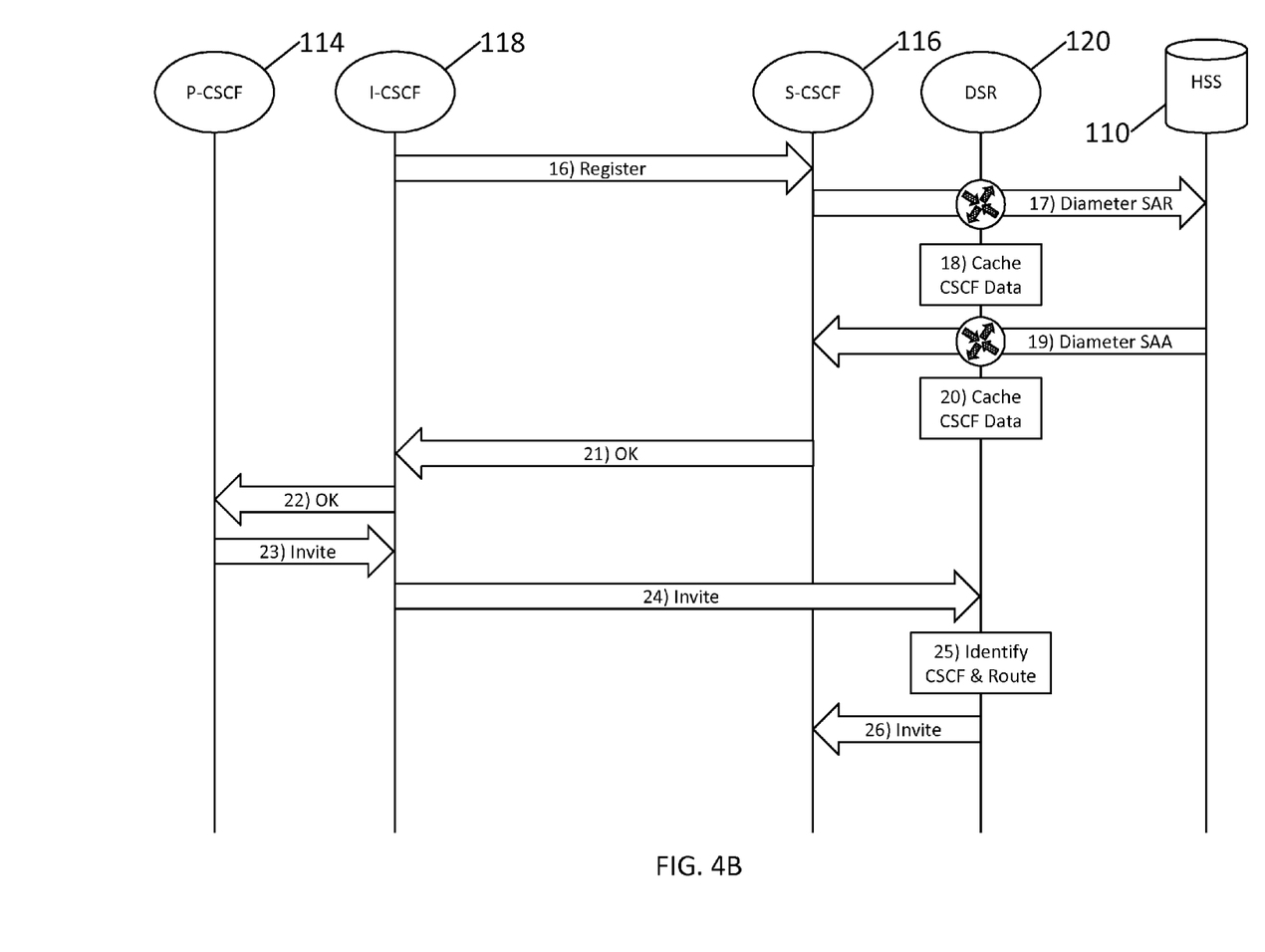

FIGS. 4A and 4B are respectively first and second portions of an exemplary message sequence for network subscriber registration and session establishment in which a message is routed by a DSR based on cached CSCF data in accordance with embodiments of the subject matter described herein. Referring to FIG. 4A, at step 1, P-CSCF node 114 may initiate registration by sending a register request message (e.g., a SIP register request message) associated with a network subscriber (e.g., a network subscriber utilizing mobile device 108) to I-CSCF node 118. At step 2, I-CSCF node 118 may query SLF node 112 to determine which HSS is associated with the network subscriber. At step 2, SLF node 112 may respond to I-CSCF node 118's query with a response identifying HSS node 110 as the HSS serving the network subscriber. At step 4, SLF node 112 may send a Diameter UAR message to HSS node 110 requesting authorization for the routing of the register request. DSR node 120 may be utilized to route the Diameter UAR message from SLF node 112 to HSS node 110. At step 5, HSS node 110 may respond to SLF node 112's Diameter UAR message with a Diameter UAA message indicating that the routing of the register request is authorized. DSR node 120 may be utilized to route the Diameter UAA message from HSS node 110 to SLF node 112. At step 6, I-CSCF node 118 may route the register request message to S-CSCF node 116. At step 7, S-CSCF node 116 may send a Diameter MAR message to HSS node 110 requesting authorization to utilize a service. DSR node 120 may be utilized to route the Diameter MAR message from S-CSCF node 116 to HSS node 110. At step 8, HSS node 110 may respond to S-CSCF node 116's Diameter MAR message with a Diameter MAA message indicating that the request to utilize the service is denied. DSR node 120 may be utilized to route the Diameter MAA message from HSS node 110 to S-CSCF node 116. At step 9, S-CSCF node 116 may send a message to I-CSCF node 118 indicating that the request is unauthorized. At step 10, I-CSCF node 118 may notify P-CSCF node 114 that the request was not authorized. At step 11, P-CSCF node 114 may send a new register request message to I-CSCF node 118. At step 12, I-CSCF node 118 may query SLF node 112 to determine which HSS is associated with the network subscriber. At step 13, SLF node 112 may respond to I-CSCF node 118's query with a response identifying HSS node 110 as the HSS serving the network subscriber. At step 14, SLF node 112 may send a Diameter UAR message to HSS node 110 requesting authorization for the routing of the register request. DSR node 120 may be utilized to route the Diameter UAR message from SLF node 112 to HSS node 110. At step 15, HSS node 110 may respond to SLF node 112's Diameter UAR message with a Diameter UAA message indicating that the routing of the register request is authorized. DSR node 120 may be utilized to route the Diameter UAA message from HSS node 110 to SLF node 112.

Referring to FIG. 4B, at step 16, I-CSCF node 118 may route the register request message to S-CSCF node 116. At step 17, S-CSCF node 116 may send a Diameter SAR message to HSS node 110 indicating the completion of the authorization process and requesting the storage of a record indicating the CSCF serving the network subscriber (e.g., S-CSCF node 116). DSR node 120 may be utilized to route the Diameter SAR message from S-CSCF node 116 to HSS node 110. In accordance with embodiments of the subject matter described herein, at step 18, DSR node 120 may identify a CSCF associated with the subscriber (e.g., S-CSCF node 116) based on the Diameter SAR message received from S-CSCF node 116 and routed to HSS node 110. For example, the Diameter SAR message received from S-CSCF node 116 and routed to HSS node 110 may contain a parameter identifying S-CSCF node 116. Having identified a CSCF associated with the subscriber, DSR node 120 may store a record associating the CSCF and the subscriber (e.g., a record associating S-CSCF node 116 with the network subscriber utilizing mobile device 108). For example, DSR node 120 may store such a record in CSCF data cache 122. At step 19, HSS node 110 may respond to S-CSCF node 116's Diameter SAR message with a Diameter SAA message indicating that the assignment has been successfully stored. DSR node 120 may be utilized to route the Diameter SAA message from HSS node 110 to S-CSCF node 116. In accordance with embodiments of the subject matter described herein, at step 20, DSR node 120 may identify a CSCF associated with the subscriber (e.g., S-CSCF node 116) based on the Diameter SAA message received from HSS node 110 and routed to S-CSCF node 116. For example, the Diameter SAA message received from HSS node 110 and routed to S-CSCF node 116 may contain a parameter identifying S-CSCF node 116. Having identified a CSCF associated with the subscriber, DSR node 120 may store a record associating the CSCF and the subscriber (e.g., a record associating S-CSCF node 116 with the network subscriber utilizing mobile device 108). For example, DSR node 120 may store such a record in CSCF data cache 122. At step 21, S-CSCF node 116 may send a message to I-CSCF node 118 indicating that the registration was successful. At step 22, I-CSCF node 118 may notify P-CSCF node 114 that the registration was successful.

At step 23, P-CSCF node 114 may initiate the establishment of a session for the subscriber by sending an invite message (e.g., a SIP invite message) to I-CSCF node 118. At step 24, I-CSCF node 118 may forward the invite message to DSR node 120. Having received the invite message from I-CSCF node 118, at step 25, DSR node 120 may utilize the record it previously stored in CSCF data cache 122 (e.g., the record associating the subscriber utilizing mobile device 108 with S-CSCF node 116) to identify a CSCF serving the subscriber (e.g., S-CSCF node 116), and, at step 26, may route the invite message to the CSCF serving the subscriber (e.g., S-CSCF node 116). As the foregoing exemplary sequence illustrates, by caching CSCF data (e.g., information associating S-CSCF node 116 with the subscriber utilizing mobile device 108) at DSR node 120, DSR node 120 is able to identify the CSCF serving the subscriber and route subsequent messages associated with the subscriber to the identified CSCF without querying other nodes within network environment 100.

Figure 5:
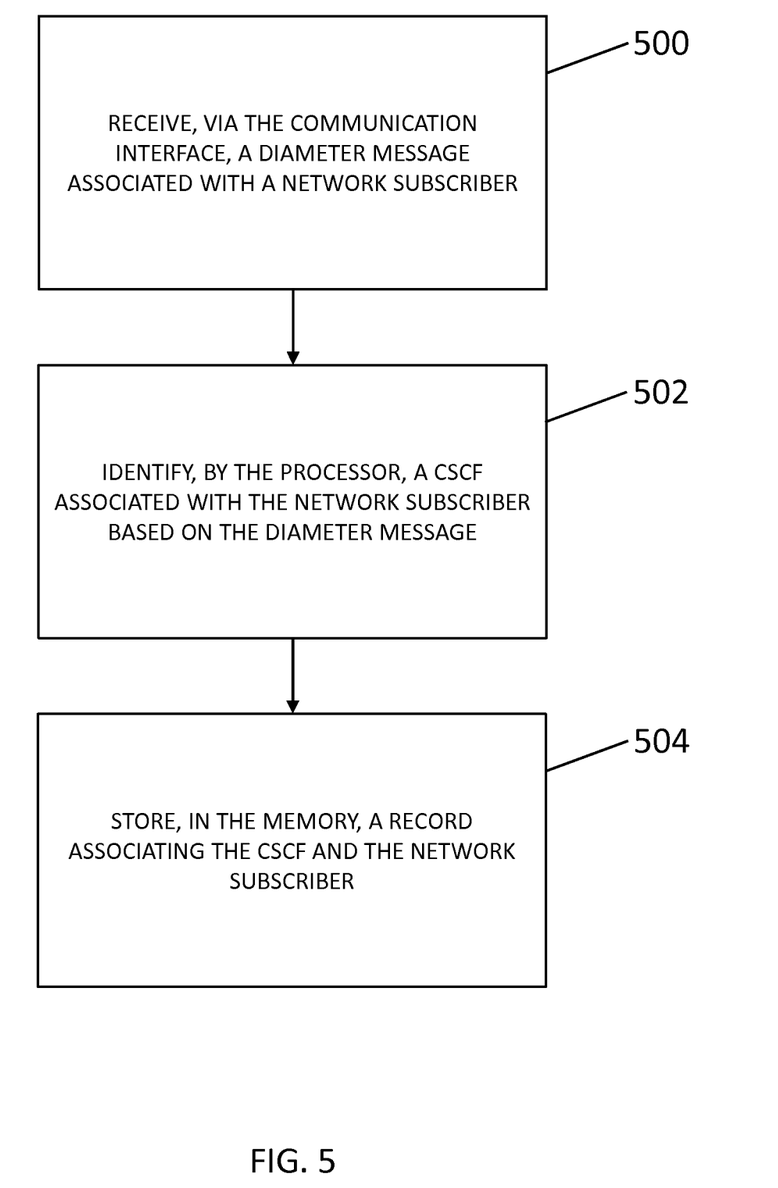
FIG. 5 is a flow chart illustrating an exemplary process for caching CSCF data at a DSR in accordance with embodiments of the subject matter described herein.

FIG. 5 is a flow chart illustrating an exemplary process for caching CSCF data at a DSR in accordance with embodiments of the subject matter described herein. Referring to FIG. 5, in step 500, a Diameter message associated with a network subscriber is received via a communication interface. For example, DSR node 120 may receive a Diameter SAR message from S-CSCF node 116 associated with a network subscriber utilizing mobile device 108 via its communication interface. In step 502, a CSCF associated with the network subscriber may be identified by the DSR's processor based on the Diameter message. For example, DSR node 120's processor may identify S-CSCF node 116 as a CSCF associated with the network subscriber utilizing mobile device 108 based on the received Diameter SAR message. In step 504, DSR node 120 may store in its memory a record associating the CSCF and the network subscriber. For example, DSR node 120 may store in CSCF data cache 122 a record associating S-CSCF node 116 with the subscriber utilizing mobile device 108.

Figure 6:
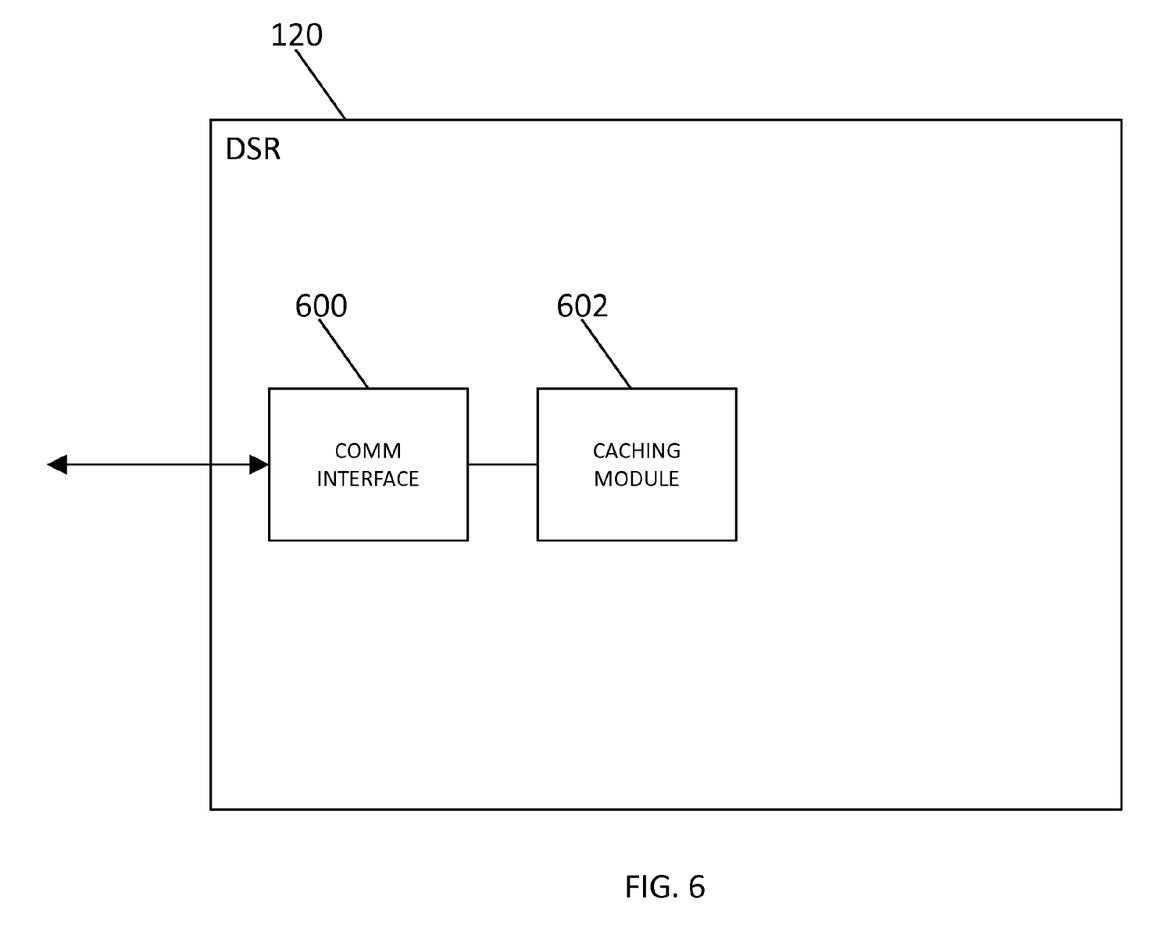
FIG. 6 is a block diagram illustrating a network node for caching CSCF data at a DSR in accordance with embodiments of the subject matter described herein.

FIG. 6 is a block diagram illustrating a network node for caching CSCF data at a DSR in accordance with embodiments of the subject matter described herein. Referring to FIG. 6, DSR node 120 may include communication interface 600. Communication interface 600 may be any communication interface suitable for sending and/or receiving messages (e.g., Diameter messages) within network environment 100. Communication interface 600 may be configured to receive a Diameter message associated with a network subscriber. For example, communication interface 600 may be configured to receive a Diameter SAR message from S-CSCF node 116 associated with a network subscriber utilizing mobile device 108. DSR node 120 may also include caching module 602. Caching module 602 may be configured to identify a CSCF associated with the network subscriber based on the Diameter message. For example, caching module 602 may be configured to identify S-CSCF node 116 as associated with a subscriber utilizing mobile device 108 based on the Diameter SAR message. Caching module 602 may also be configured to store a record associating the CSCF and the network subscriber. For example, caching module 602 may be configured to store a record associating S-CSCF node 116 and the subscriber utilizing mobile device 108.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for caching call session control function (CSCF) data at a Diameter signaling router (DSR), the method comprising:
at a DSR network node comprising a communication interface, a processor, and a memory:
receiving, via the communication interface, a Diameter message associated with a network subscriber;
identifying, by the processor, a CSCF associated with the network subscriber based on the Diameter message;
storing, in the memory, a record associating the CSCF and the network subscriber;
receiving, via the communication interface, a session initiation protocol (SIP) invite message associated with the network subscriber; and
routing, by the processor, the SIP invite message to the CSCF based on the record.

2. The method of claim 1 further comprising:
receiving, via the communication interface and from a requesting node, a Diameter request message associated with the network subscriber;
generating, by the processor, a Diameter answer message based on the stored record; and
communicating, via the communication interface and to the requesting node, the Diameter answer message.

3. The method of claim 2 wherein the Diameter answer message includes information that identifies the CSCF.

4. The method of claim 2 wherein the Diameter request message comprises at least one of a location information request (LIR), a user authorization request (UAR), a multimedia authorization request (MAR), and a server assignment request (SAR).

5. The method of claim 2 wherein the requesting node comprises at least one of a proxy CSCF, an interrogating CSCF, and a subscriber location function (SLF).

6. The method of claim 1 wherein the Diameter message comprises at least one of a location information request (LIR), a user authorization request (UAR), a multimedia authorization request (MAR), and a server assignment request (SAR).

7. The method of claim 1 wherein the DSR network node includes at least one of a Diameter routing agent, a Diameter proxy agent, and a Diameter translation agent.

8. A system for caching call session control function (CSCF) data at a Diameter signaling router (DSR), the system comprising:
a DSR network node comprising:
a communication interface;
and
wherein the memory includes executable instructions that when executed by the processor control a DSR network module, stored in memory, to perform steps comprising:
receiving, via the communication interface, a Diameter message associated with a network subscriber;
identifying a CSCF associated with the network subscriber based on the Diameter message;

storing, in the memory, a record associating the CSCF and the network subscriber;

receiving, via the communication interface, a session initiation protocol (SIP) invite message associated with the network subscriber; and routing the SIP invite message to the CSCF based on the record.

9. The system of claim 8 wherein the memory includes executable instructions that when executed by the processor control the DSR network module to perform steps comprising:

receiving, via the communication interface and from a requesting node, a Diameter request message associated with the network subscriber;

generating a Diameter answer message based on the stored record; and communicating, via the communication interface and to the requesting node, the Diameter answer message.

10. The system of claim 9 wherein the Diameter answer message includes information that identifies the CSCF.

11. The system of claim 9 wherein the Diameter request message comprises at least one of a location information request (LIR), a user authorization request (UAR), a multimedia authorization request (MAR), and a server assignment request (SAR).

12. The system of claim 9 wherein the requesting node comprises at least one of a proxy CSCF, an interrogating CSCF, and a subscriber location function (SLF).

13. The system of claim 8 wherein the Diameter message comprises at least one of a location information request (LIR), a user authorization request (UAR), a multimedia authorization request (MAR), and a server assignment request (SAR).

14. The system of claim 8 wherein the DSR network node includes at least one of a Diameter routing agent, a Diameter proxy agent, and a Diameter translation agent.

15. A non-transitory computer readable medium comprising executable instructions that when executed by a processor of a computer control the computer to perform steps comprising:

at a DSR network node comprising a communication interface, a processor, and a memory:

receiving, via the communication interface, a Diameter message associated with a network subscriber;

identifying, by the processor, a CSCF associated with the network subscriber based on the Diameter message;

storing, in the memory, a record associating the CSCF and the network subscriber;

receiving, via the communication interface, a session initiation protocol (SIP) invite message associated with the network subscriber; and routing, by the processor, the SIP invite message to the CSCF based on the record.

* * * * *